United States Patent
Van Den Bosch et al.

(10) Patent No.: US 8,868,714 B2
(45) Date of Patent: Oct. 21, 2014

(54) NETWORK MANAGEMENT SYSTEM, NETWORK, METHOD AND COMPUTER PROGRAM PRODUCT

(75) Inventors: Sven Jozef Jeanne Van Den Bosch, Lochristi (BE); Gert Van Hoey, Gentbrugge (BE); Paloma De La Vallee-Poussin, Aartselaar (BE); Natalie Maria Cornelia Degrande, Overmere (BE)

(73) Assignee: Alcatel Lucent, Boulogne-Billancourt (FR)

( * ) Notice: Subject to any disclaimer, the term of this patent is extended or adjusted under 35 U.S.C. 154(b) by 921 days.

(21) Appl. No.: 10/265,375

(22) Filed: Oct. 7, 2002

(65) Prior Publication Data
US 2003/0084149 A1 May 1, 2003

(30) Foreign Application Priority Data
Oct. 8, 2001 (EP) .................................. 01402584

(51) Int. Cl.
*G06F 15/173* (2006.01)
*G06F 15/16* (2006.01)
*H04L 12/707* (2013.01)
*H04L 12/24* (2006.01)

(52) U.S. Cl.
CPC ............ *H04L 41/0896* (2013.01); *H04L 45/22* (2013.01); *H04L 41/5003* (2013.01)
USPC ........... 709/224; 709/223; 709/225; 709/226; 709/227; 709/228; 709/229; 709/238; 709/239; 709/240; 709/241; 709/242; 709/243; 709/244; 709/249; 709/250; 709/251; 709/252; 709/253

(58) Field of Classification Search
CPC . H04L 41/0896; H04L 41/5003; H04L 41/08; H04L 41/0803; H04L 41/085; H04L 41/0866; H04L 41/0876; H04L 41/0893; H04L 41/12; H04L 41/50; H04L 41/14; H04L 41/142; H04L 41/145; H04L 41/147; H04L 41/20; H04L 41/22; H04L 41/24; H04L 41/26; H04L 45/22; H04L 45/00; H04L 45/02; H04L 45/12; H04L 45/121; H04L 45/122; H04L 45/123; H04L 45/124; H04L 45/125; H04L 45/126; H04L 45/127; H04L 45/128; H04L 45/14; H04L 45/16; H04L 45/18; H04L 45/20; H04L 45/24; H04L 45/26; H04L 45/28; H04L 45/30; H04L 45/34; H04L 45/38; H04L 45/42; H04L 45/44; H04L 45/46; H04L 45/48; H04L 45/56; H04L 45/70; H04L 45/72; H04L 47/00
USPC .......... 370/234, 237, 238, 406, 389; 709/233, 709/223, 238–244, 224, 225, 226, 227, 228, 709/229, 249, 250, 251, 252, 253; 701/201–203, 206, 208–210
See application file for complete search history.

(56) References Cited

U.S. PATENT DOCUMENTS 5,815,492 A * 9/1998 Berthaud et al. ............... 370/234
5,940,372 A * 8/1999 Bertin et al. ................... 370/238

(Continued)

OTHER PUBLICATIONS

Poppe F et al: "Choosing the Objectives for Traffic Engineering I IP Backbone Networks based on Quality-of-Service Requirements" Proceedings, Quality of Future Internet Services, International Workshop, QOFIS 2000, Sep. 25-26, 2000, pp. 129-140, XP008002112.

(Continued)

*Primary Examiner* — Saket K Daftuar
(74) *Attorney, Agent, or Firm* — Wolff & Samson, PC.

(57) ABSTRACT

Known network management systems for managing traffic signals in a network store node/link parameter signals and traffic parameter signals and calculate solutions defining intermediate nodes/links situated between sources and destinations for transporting said traffic signals from said sources to said destinations via said intermediate nodes/links and calculate route information per solution. By storing node/link parameter signals and traffic parameter signals for several situations (like several predictions in the future) and calculating solutions for each situation and then selecting a solution per situation, the network management system will manage the network more advantageously, especially when solutions are compared with each other, and when a solution is selected per situation in dependence of comparison results (comprising similarities/differences between solutions of different situations). Said route information may comprise link load parameters and/or resource consumption parameters and/or fairness parameters and/or throughput parameters.

15 Claims, 11 Drawing Sheets

(56) References Cited

U.S. PATENT DOCUMENTS

| | | | |
|---|---|---|---|
| 6,286,052 B1 * | 9/2001 | McCloghrie et al. | 709/238 |
| 6,317,686 B1 * | 11/2001 | Ran | 701/210 |
| 6,493,317 B1 * | 12/2002 | Ma | 370/237 |
| 6,564,145 B2 * | 5/2003 | Kim et al. | 701/209 |
| 7,020,115 B2 * | 3/2006 | Chillariga et al. | 370/337 |
| 7,212,490 B1 * | 5/2007 | Kao et al. | 370/222 |
| 2004/0202158 A1 * | 10/2004 | Takeno et al. | 370/389 |

OTHER PUBLICATIONS

Sven Van Den Bosch, et al: "Multi-Objective Traffic Engineering of IP Networks Using Label Switched Paths" Networks 2000 Conference, Toronto, Canada, Sep. 10-15, 2000, pp. 1-6.

* cited by examiner

NETWORK MANAGEMENT SYSTEM, NETWORK, METHOD AND COMPUTER PROGRAM PRODUCT

The invention relates to a network management system for managing traffic signals in a network comprising nodes/links, which network management system comprises a memory for storing node/link parameter signals defining nodes/links and for storing traffic parameter signals defining said traffic signals to be transported via nodes/links and comprising a calculator coupled to said memory for calculating solutions defining intermediate nodes/links situated between sources and destinations for transporting said traffic signals from said sources to said destinations via said intermediate nodes/links and for calculating route information per solution.

The functionality of such a network management system is known from the article "Multi-objective Traffic Engineering of IP Networks Using Label-Switched Paths", Networks 2000 conference, Toronto, Canada, Sep. 10-15, 2000, which discloses a traffic engineering algorithm also usable for short term capacity planning. Said algorithm solves a traffic engineering problem formulated as a mixed integer linear program comprising at least one objective and several constraints by calculating solutions defining intermediate nodes/links situated between sources and destinations for transporting said traffic signals from said sources to said destinations via said intermediate nodes/links and by calculating route information per solution.

The known network management system is disadvantageous, inter alia, due to solving each traffic engineering problem solely per problem.

SUMMARY OF INVENTION

It is an object of the invention, inter alia, of providing a network management system as defined in the preamble which can handle a group of interacting traffic engineering problems.

The network management system according to the invention is characterised in that said network management system comprises a selector, with said memory comprising node/link parameter signals and traffic parameter signals for several situations and with said calculator calculating solutions for each situation, and with said selector selecting a solution per situation.

By providing the network management system with said selector, a solution per situation can be calculated, with each situation corresponding with at least one traffic engineering problem.

The invention is based on the insight, inter alia, that traffic engineering problems occur all the time, with one traffic engineering problem often not being completely independent from neighbouring problems.

The invention solves the problem, inter alia, of providing a network management system which can handle a group of interacting traffic engineering problems.

At least a part of the inventivity of the invention is situated, inter alia, in realizing that traffic engineering problems (and their solutions) sometimes interact and therefore usually cannot be regarded to be completely independent from one another.

A first embodiment of the network management system according to the invention is characterised in that said network management system comprises a comparator coupled to said calculator for comparing solutions with each other.

By introducing said comparator, for example several solutions all belonging to the same situation and therefore all solving the same problem in different ways can be compared with each other.

A second embodiment of the network management system according to the invention is characterised in that said selector is coupled to said comparator for selecting a solution per situation in dependence of at least one comparison result.

By coupling said selector to said comparator, selections can now be made dependently from comparison results.

A third embodiment of the network management system according to the invention is characterised in that at least one comparison result comprises similarities/differences between solutions of different situations.

In case at least one comparison result comprises similarities/differences between solutions of different situations, said comparator can now compare several solutions belonging to different situations, thereby taking into account the fact that different traffic engineering problems (and their solutions) interact with each other.

A fourth embodiment of the network management system according to the invention is characterised in that said network management system comprises a processor which comprises said calculator and/or said selector and/or said comparator.

By introducing said processor, for example having a calculating function and/or a selecting function and/or a comparing function, said calculator and/or said selector and/or said comparator are implemented advantageously.

A fifth embodiment of the network management system according to the invention is characterised in that said route information comprises link load parameters and/or resource consumption parameters and/or fairness parameters and/or throughput parameters.

Said link load parameters and/or resource consumption parameters and/or fairness parameters and/or throughput parameters are just non-limitative examples of said route information for supporting said selecting.

A sixth embodiment of the network management system according to the invention is characterised in that each situation corresponds with a prediction in the future.

With each situation corresponding with a prediction in the future, traffic is forecasted for moments in time lying in the future and yet to come, with the corresponding traffic engineering problems being solved advantageously due to taking into account any interactions between these problems (and their solutions).

The invention further relates to a network comprising nodes/links and at least one network management system for managing traffic signals in said network, which network management system comprises a memory for storing node/link parameter signals defining nodes/links and for storing traffic parameter signals defining said traffic signals to be transported via nodes/links and comprising a calculator coupled to said memory for calculating solutions defining intermediate nodes/links situated between sources and destinations for transporting said traffic signals from said sources to said destinations via said intermediate nodes/links and for calculating route information per solution.

The network according to the invention is characterised in that said network management system comprises a selector, with said memory comprising node/link parameter signals and traffic parameter signals for several situations and with said calculator calculating solutions for each situation, and with said selector selecting a solution per situation.

Embodiments of the network according to the invention are in correspondence with embodiments of the network management system according to the invention.

The invention yet further relates to a method for managing traffic signals in a network comprising nodes/links, which method comprises a first step of calculating solutions defining intermediate nodes/links situated between sources and destinations for transporting said traffic signals from said sources to said destinations via said intermediate nodes/links and comprises a second step of calculating route information per solution, with node/link parameter signals defining nodes/links and traffic parameter signals defining said traffic signals to be transported via nodes/links being stored in a memory.

The method according to the invention is characterised in that said method comprises a third step of selecting a solution per situation, with said memory comprising node/link parameter signals and traffic parameter signals for several situations, and with solutions being calculated for each situation.

Embodiments of the method according to the invention are in correspondence with embodiments of the network management system according to the invention.

The invention also relates to a computer program product for managing traffic signals in a network comprising nodes/links, which computer program product is to be run via processor coupled to a memory for storing node/link parameter signals defining nodes/links and for storing traffic parameter signals defining said traffic signals to be transported via nodes/links, which computer program product comprises a first function of calculating solutions defining intermediate nodes/links situated between sources and destinations for transporting said traffic signals from said sources to said destinations via said intermediate nodes/links and comprises a second function of calculating route information per solution.

The computer program product according to the invention is characterised in that said computer program product comprises a third function of selecting a solution per situation, with said memory comprising node/link parameter signals and traffic parameter signals for several situations, and with solutions being calculated for each situation.

Embodiments of the computer program product according to the invention are in correspondence with embodiments of the network management system according to the invention.

The article "Multi-objective Traffic Engineering of IP Networks Using Label-Switched Paths", Networks 2000 conference, Toronto, Canada, Sep. 10-15, 2000, discloses a traffic engineering algorithm also usable for short term capacity planning. Said algorithm solves a traffic engineering problem formulated as a mixed integer linear program comprising at least one objective and several constraints. The article "Choosing the Objectives for Traffic Engineering in IP Backbone Networks based on Quality-of-Service Requirements", QoFIS 2000 conference, Berlin, Germany, September, 2000, also discloses a traffic engineering algorithm solving a traffic engineering problem formulated as a mixed integer linear program comprising at least one objective and several constraints. Both articles are considered to be incorporated by reference.

BRIEF DESCRIPTION OF DRAWINGS

The invention will be further explained more detailledly at the hand of an example shown in the drawings, whereby FIG. 1 discloses a network management system according to the invention comprising a memory, a calculator, a selector and a comparator, and FIG. 2 discloses a network comprising nodes/links with node/link parameter signals traffic parameter signals being defined for three situations shown horizontally next to each other, with three solutions being shown vertically per situation, and FIG. 3 discloses a flow chart illustrating a method according to the invention and a computer program product according to the invention.

DETAILED DESCRIPTION OF EXEMPLARY EMBODIMENTS OF THE INVENTION

Figure 1:
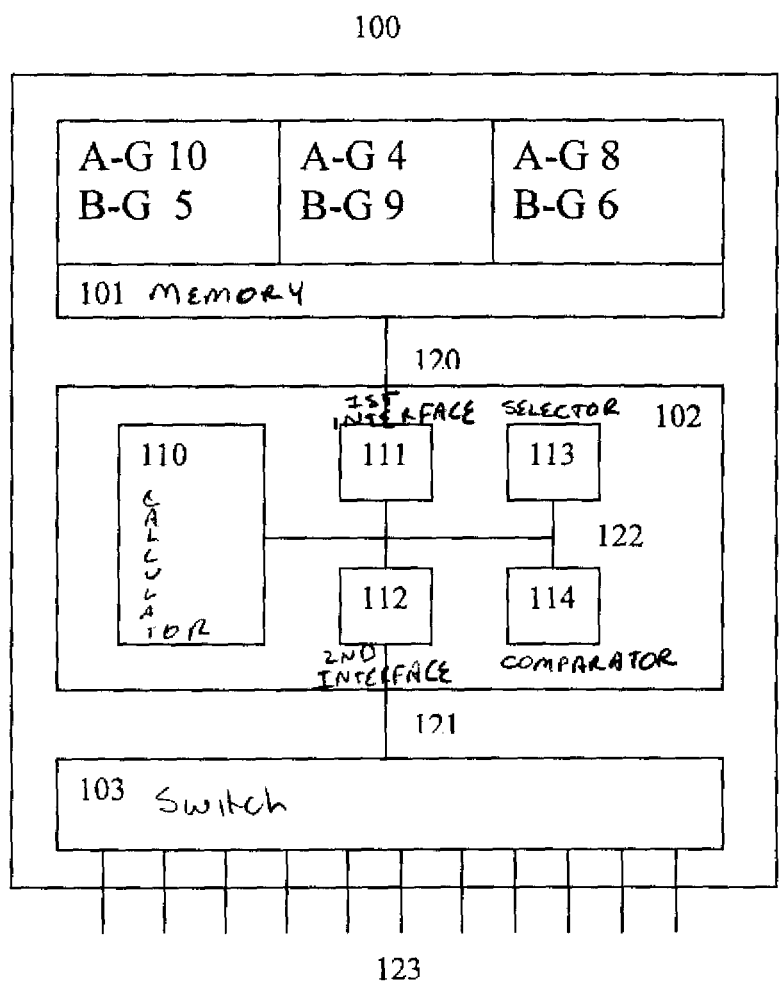
Figure 2A:
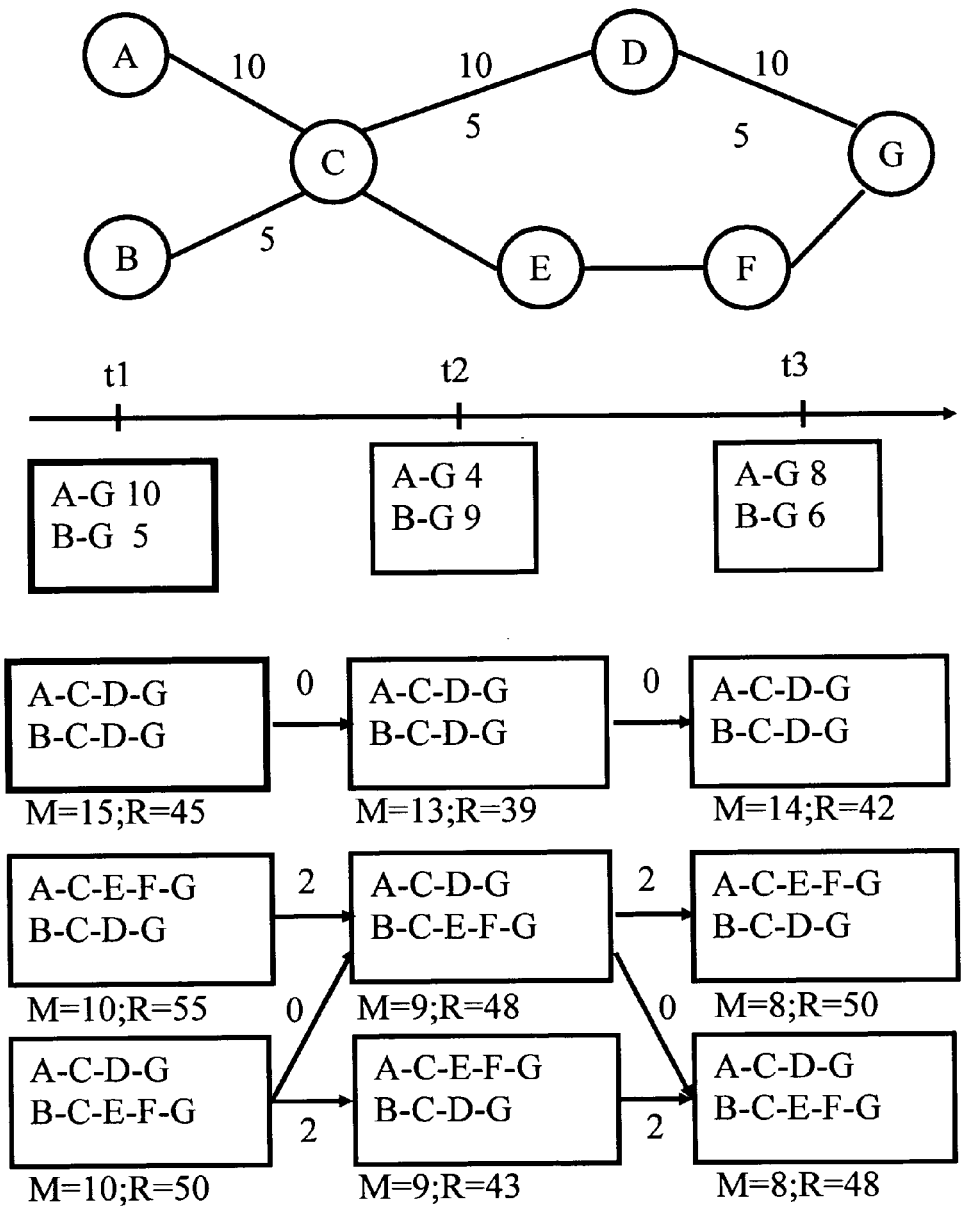
Figure 2B:
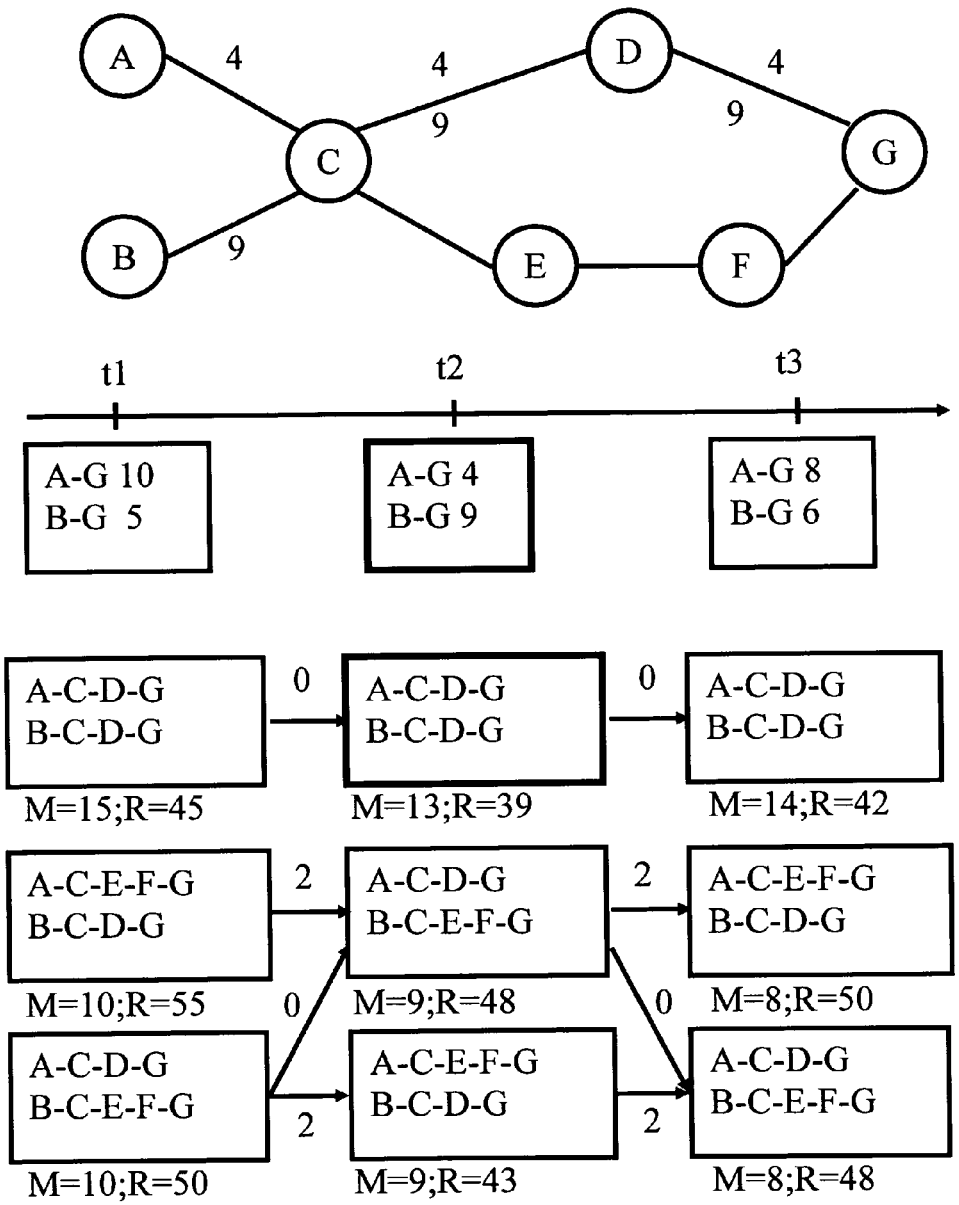
Figure 2C:
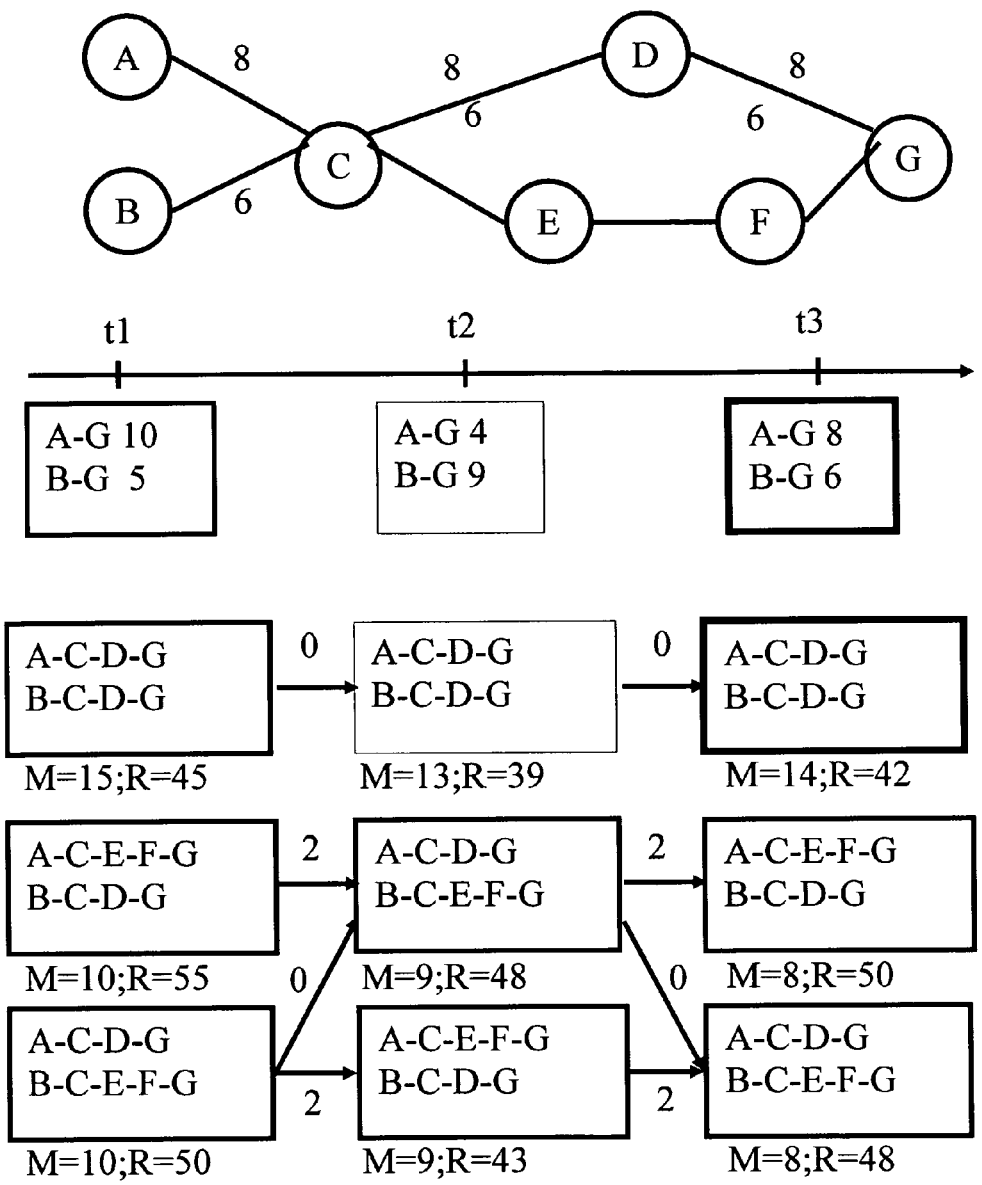
Figure 2D:
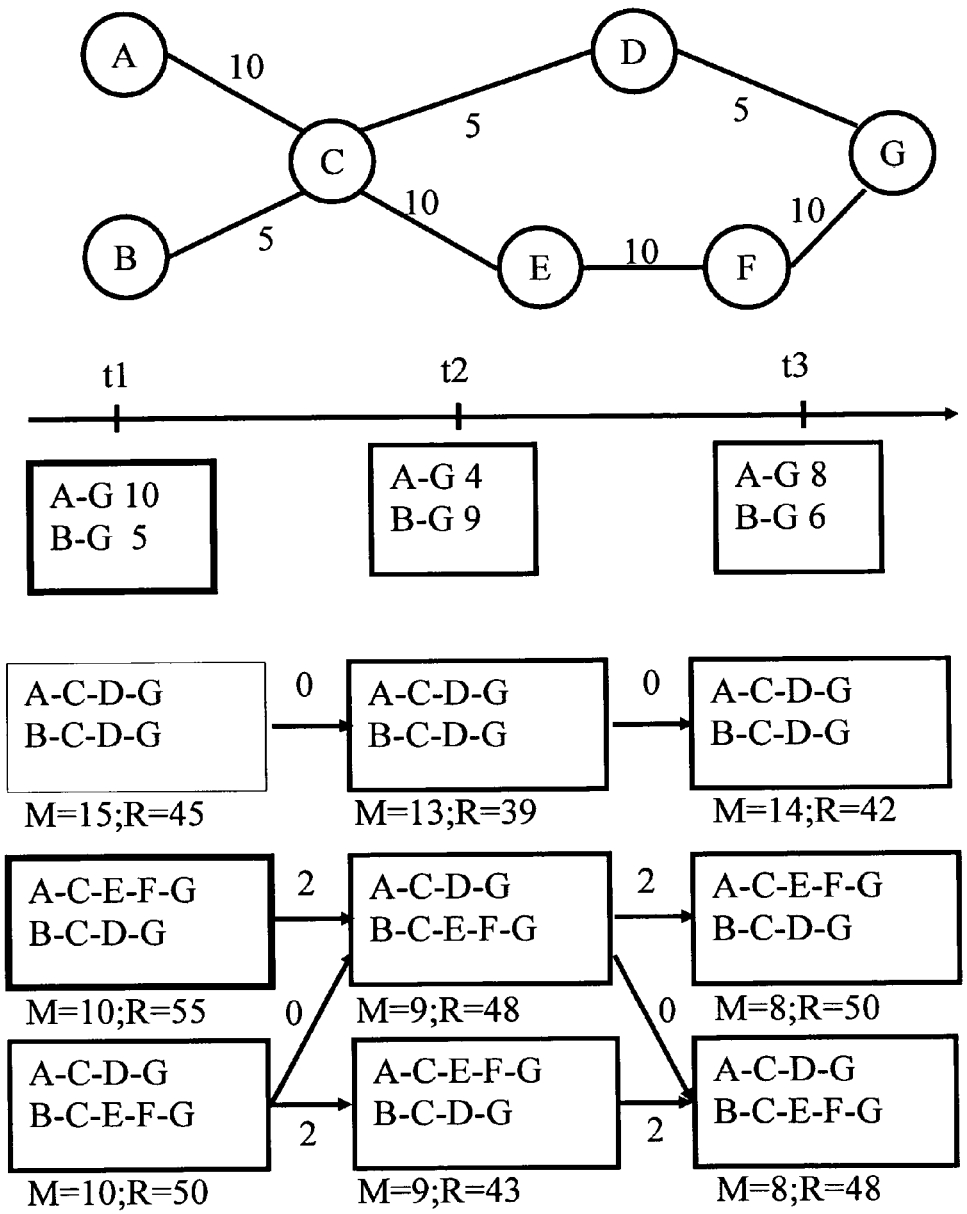
Figure 2E:
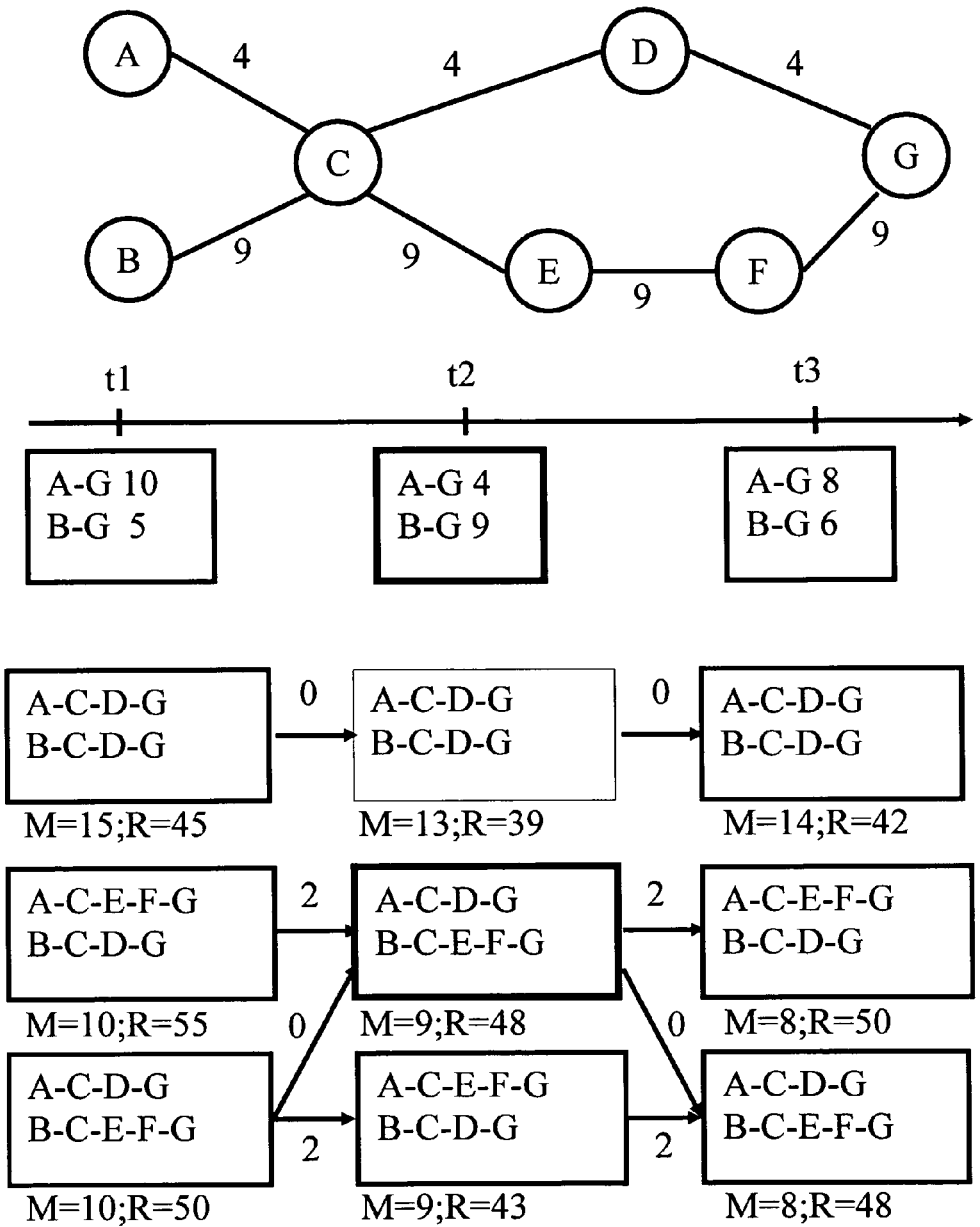
Figure 2F:
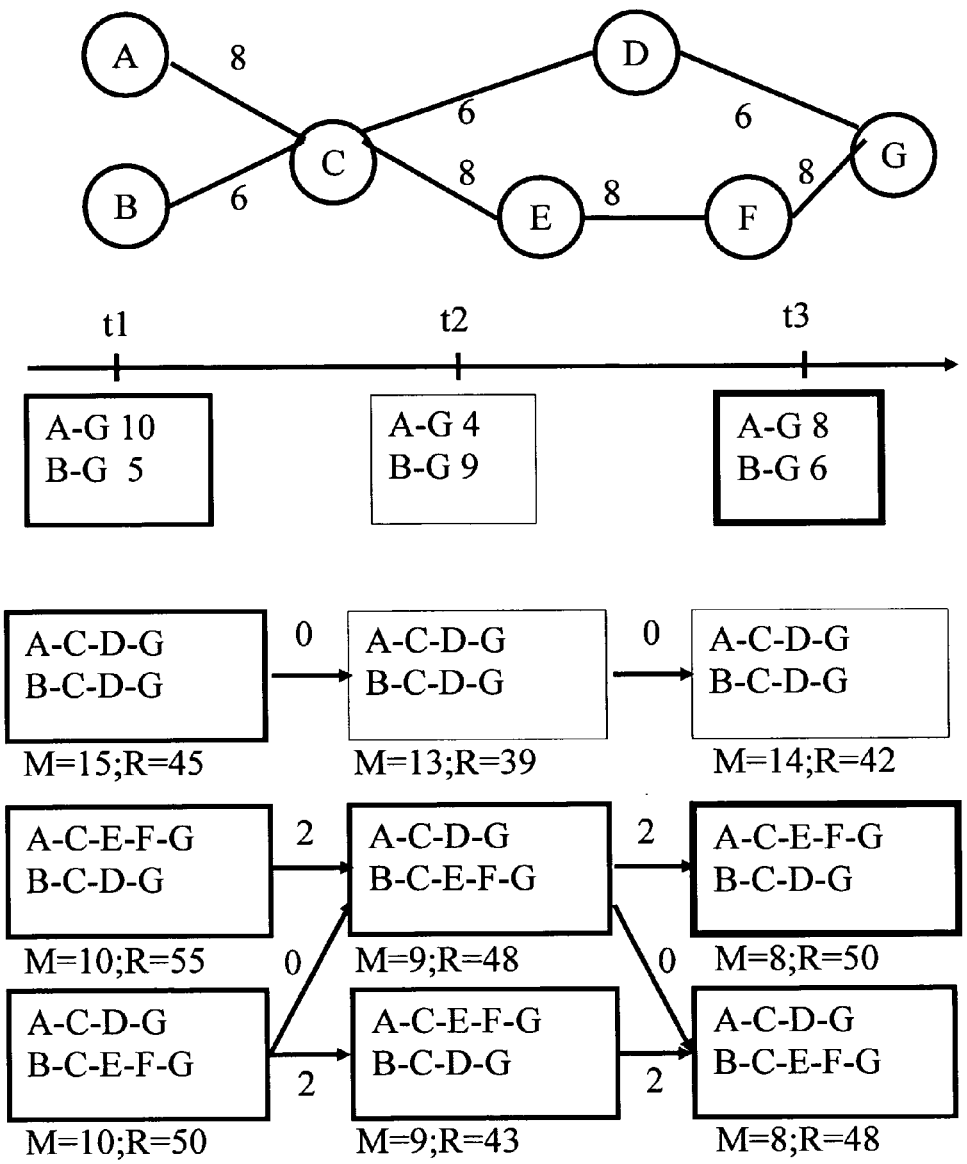
Figure 2G:
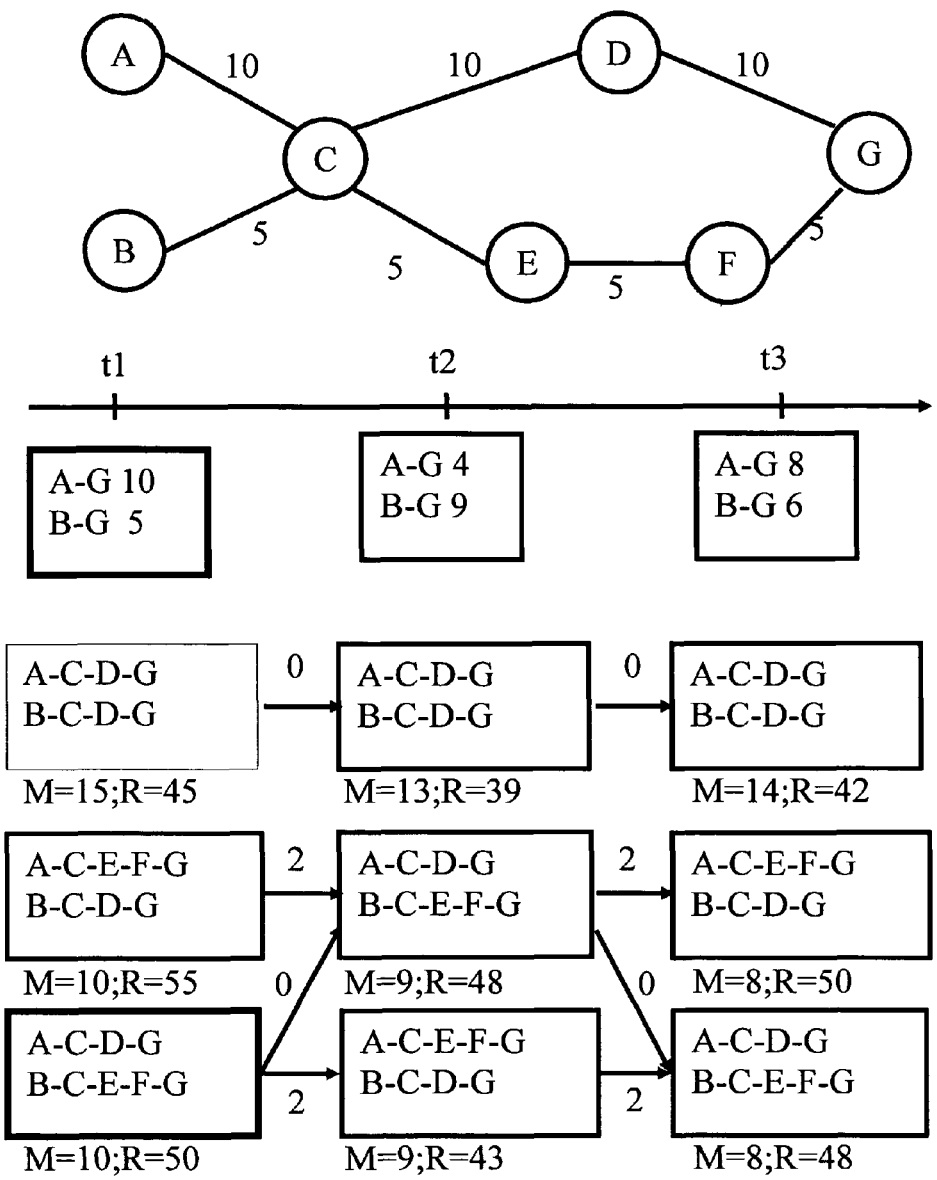
Figure 2H:
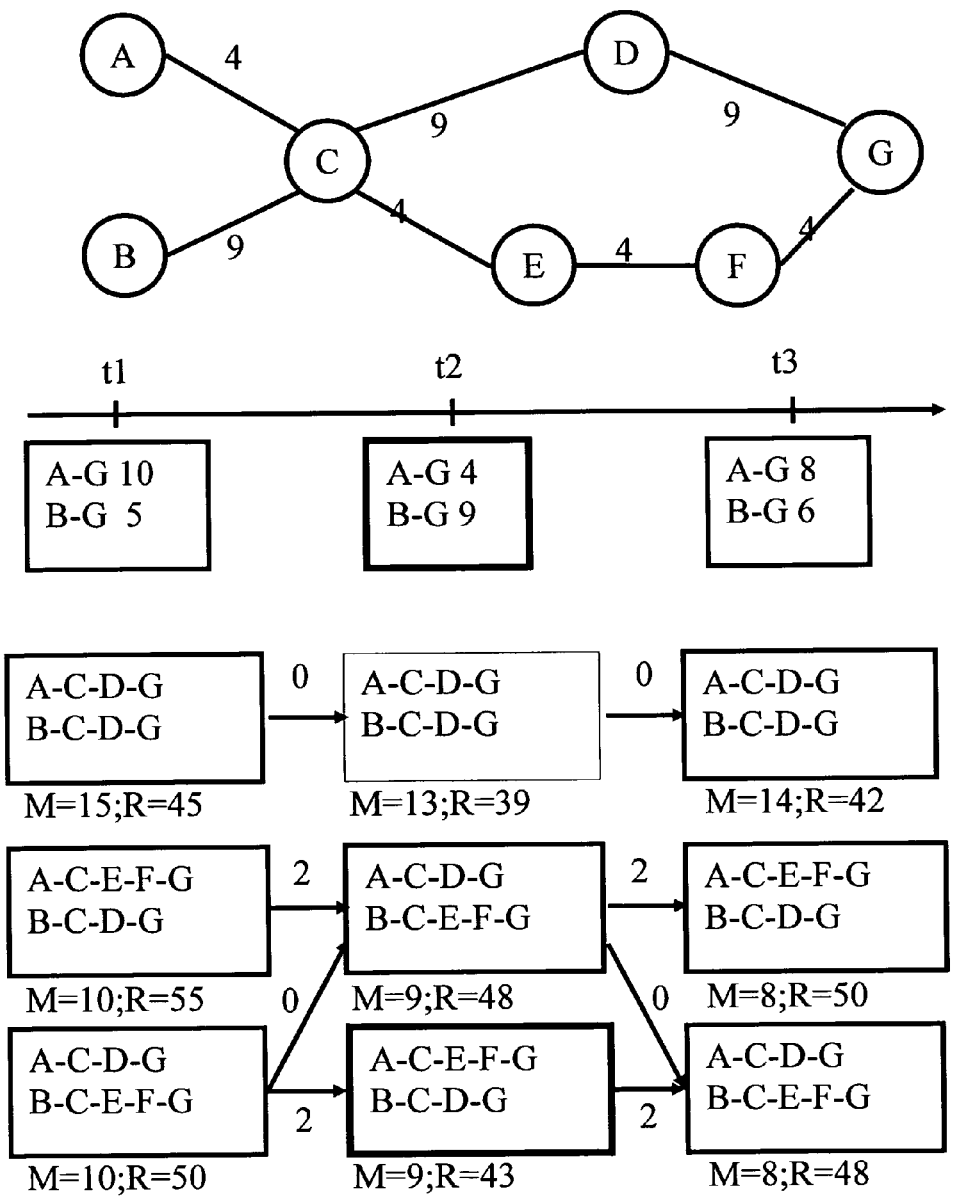
Figure 2I:
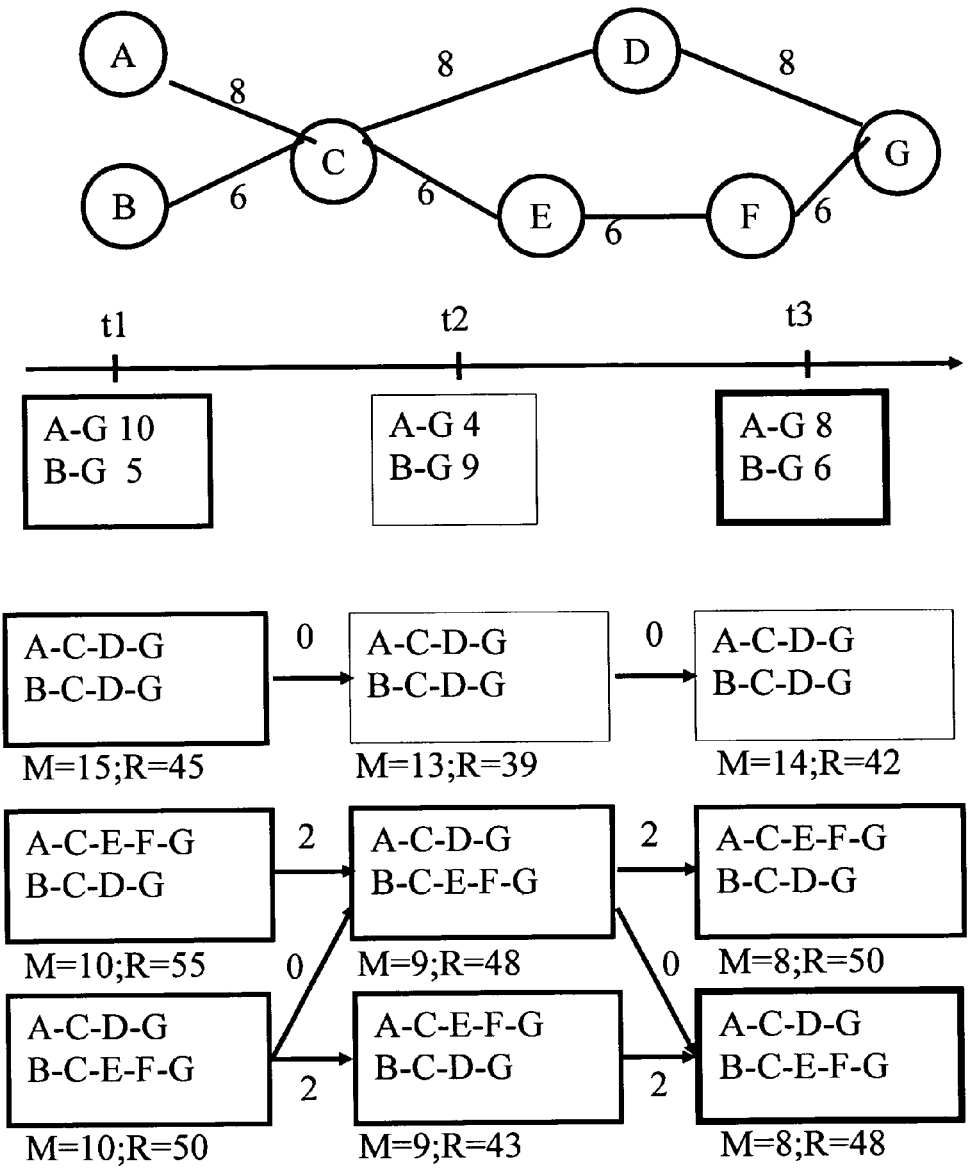

FIG. 1 discloses a network management system 100 according to the invention comprising a memory 101 coupled via a connection 120 to a processor system 102 which is coupled via a connection 121 to a switch 103 which is to be coupled via connections 123 to nodes. Processor system 102 comprises a first interface 111 coupled to connection 120 and to a bus 122 and comprises a second interface 112 coupled to connection 121 and to bus 122. Bus 122 is further coupled to a calculator 110, to a selector 113 and to a comparator 114.

Memory 101 comprises three fields, each field corresponding with a situation, the first situation defining traffic signals to be transported from a node A to a node G with a capacity of 10 Mbyte and traffic signals to be transported from a node B to node G with a capacity of 5 Mbyte both at a future time t1. The second situation defines traffic signals to be transported from node A to node G with a capacity of 4 Mbyte and traffic signals to be transported from node B to node G with a capacity of 9 Mbyte both at a future time t2. The third situation defines traffic signals to be transported from node A to node G with a capacity of 8 Mbyte and traffic signals to be transported from node B to node G with a capacity of 6 Mbyte both at a future time t3. Further, but not shown, memory 101 comprises topology information defining the topology of a network shown in FIG. 2. This topology information is stored in the form of node/link parameter signals defining nodes/links. Said traffic signals to be transported are stored in the form of traffic parameter signals defining said traffic signals to be transported via said nodes/links.

FIG. 2 discloses a network comprising a node A and a node B each one of them being coupled to a node C which is further coupled via a node D to a node G and via a node E and a node F to said node G. FIG. 2 further discloses said three situations at future times t1, t2 and t3, and discloses a matrix of nine blocks, a first row comprising first solutions for said three situations, a second row comprising second solutions for said three situations and a third row comprising third solutions for said three situations.

Said first row comprising first solutions for said three situations is the result of so-called shortest path calculations, which have been made in accordance with, inter alia, the referenced prior art documents, with said first solutions defining intermediate nodes/links (for all situations nodes C and D) situated between sources (for all situations node A and node B respectively) and destinations (for all situations node G) for transporting said traffic signals (first situation: 10 Mbyte and 5 Mbyte respectively; second situation: 4 Mbyte and 9 Mbyte respectively; third situation: 8 Mbyte and 6 Mbyte respectively) from said sources to said destinations via said intermediate nodes/links and for calculating route information (maximum link load M and resource consumption R) per solution (first situation: M=10+5=15 Mbyte, R=10+10+10+5+5+5=45 Mbyte; second situation: M=4+9=13 Mbyte, R=4+4+4+9+9+9=39 Mbyte; third situation: M=8+6=14 Mbyte, R=8+8+8+6+6+6=42 Mbyte).

Said second row comprising second solutions for said three situations is the result of further path calculations, which have been made in accordance with, inter alia, the referenced prior art documents, with said second solutions defining intermediate nodes/links (first situation: nodes C and E and F and nodes C and D respectively; second situation: nodes C and D and nodes C and E and F respectively; third situation: nodes C and E and F and nodes C and D respectively) situated between sources (for all situations node A and node B respectively) and destinations (for all situations node G) for transporting said traffic signals (first situation: 10 Mbyte and 5 Mbyte respectively; second situation: 4 Mbyte and 9 Mbyte respectively; third situation: 8 Mbyte and 6 Mbyte respectively) from said sources to said destinations via said intermediate nodes/links and for calculating route information (maximum link load M and resource consumption R) per solution (first situation: M=10 Mbyte, R=10+10+10+10+5+5+5=55 Mbyte; second situation: M=9 Mbyte, R=4+4+4+9+9+9+9=48 Mbyte; third situation: M=8 Mbyte, R=8+8+8+8+6+6+6=50 Mbyte).

Said third row comprising third solutions for said three situations is the result of yet further path calculations, which have been made in accordance with, inter alia, the referenced prior art documents, with said third solutions defining intermediate nodes/links (first situation: nodes C and D and nodes C and E and F respectively; second situation: nodes C and E and F and nodes C and D respectively; third situation: nodes C and D and nodes C and E and F respectively) situated between sources (for all situations node A and node B respectively) and destinations (for all situations node G) for transporting said traffic signals (first situation: 10 Mbyte and 5 Mbyte respectively; second situation: 4 Mbyte and 9 Mbyte respectively; third situation: 8 Mbyte and 6 Mbyte respectively) from said sources to said destinations via said intermediate nodes/links and for calculating route information (maximum link load M and resource consumption R) per solution (first situation: M=10 Mbyte, R=10+10+10+5+5+5+5=50 Mbyte; second situation: M=9 Mbyte, R=4+4+4+4+9+9+9=43 Mbyte; third situation: M=8 Mbyte, R=8+8+8+6+6+6+6=48 Mbyte).

According to prior art, network management system 100 either comprises memory 101 and calculator 110 and is located in each node, or comprises memory 101 and calculator 110 and switch 103 which is coupled to (at least some of) the nodes. Memory 101 then just comprises one field corresponding with one situation, and memory 101 comprises topology information defining (at least a part of) the topology of the network shown in FIG. 2. Calculator 110 calculates one or more solutions for said one situation, dependent upon the available time. In case of one solution being calculated, this one solution is the only one and therefore chosen to be the one for solving the problem. In case of more than one solution being calculated, the last one usually is the best solution and therefore chosen to be the one for solving the problem (whereby it should be noted that previous and therefore usually worse solutions are not kept/stored due to being not that good as the last one). After this, a next situation can be handled, etc. Or, memory 101 may comprise more than one field, each one corresponding with a different situation, but even then each situation is taken care of independently from the others.

According to the invention, the network management system further comprises at least said selector 113 and possibly further comprises at least said comparator 114, and at least several solutions per situation are calculated by calculator 110 and kept/stored this time, for allowing a selection.

According to a first possibility, route information parameters (like for example the maximum link load M and/or the resource consumption R) calculated per solution per situation are used to let calculator 110 calculate thresholds for said route information parameters (for example by performing a function on the route information parameters calculated for all solutions in one situation or calculated for specific solutions for specific situations), after which said selector 113 selects a solution per situation for example in dependence of the thresholds being exceeded or not by the route information parameters of that solution and/or in dependence of the route information parameters of that solution lying closest to said thresholds etc.

According to a second possibility, possibly in addition to the first possibility, said comparator 114 compares solutions of one situation with each other for supporting said selection for selecting a solution per situation in dependence of at least one comparison result.

According to a third possibility, possibly in addition to the first and/or second possibility, said comparator 114 compares solutions of different situations with each other, as a result of which at least one comparison result will comprise similarities/differences between solutions of different situations. For example, as shown in FIG. 2, between any pair of solutions belonging to neighbouring situations, the calculated paths per traffic signal are compared, resulting in a number of path amendments per said pair of solutions. As can be derived from FIG. 2, a transition from the second solution of the first situation to the second solution of the second situation requires two path amendments, a transition from the second solution of the second situation to the second solution of the third situation requires two path amendments, a transition from the third solution of the first situation to the third solution of the second situation requires two path amendments, and a transition from the third solution of the second situation to the third solution of the third situation requires two path amendments. But a transition from the third solution of the first situation to the second solution of the second situation requires no (zero) path amendments, and a transition from the second solution of the second situation to the third solution of the third situation also requires no (zero) path amendments. Then, for example in case of a number of path amendments being required to be as little as possible, said selector 113 will select the third solution of the first situation, the second solution of the second situation and the third solution of the third situation.

According to a fourth possibility, possibly in addition to the first and/or second and/or third possibility, said comparator 114 compares solutions of different situations with each other, as a result of which at least one comparison result will comprise similarities/differences between solutions of different situations. Then calculator 110 will calculate thresholds for said route information parameters and/or for said similarities/differences (for example by performing a function on the route information parameters calculated for all solutions in one situation or calculated for specific solutions for specific situations and/or for example by performing a function on said similarities/differences), after which said selector 113 selects a solution per situation, for example in dependence of the thresholds being exceeded or not by the route information parameters of that solution and/or by the similarities/differences of that solution, and/or in dependence of the route information parameters of that solution and/or similarities/differences of that solution lying closest to said thresholds, and/or by for example firstly minimizing the maximum link load M and/or secondly minimizing the resource consumption R etc.

Each part of network management system 100, shown in the form of a block or not shown, can be 100% hardware, 100% software or a mixture of both. Therefore, a calculator also comprises a calculating function, a selector also comprises a selecting function, and a comparator als comprises a comparing function. Each block shown or not shown can be integrated with each other block shown and/or not shown. In addition to the memory 101 shown, each block can have a further memory not shown for efficiency purposes. One or more of said calculator 110, first interface 111, second interface 112, selector 113 and comparator 114 may be (partly or entirely) integrated into processor system 102.

The bus 122 may be replaced by separate connections, thereby for example introducing multiplexers and demultiplexers in. Memory 101 can be for example a DPRAM, or a server controlled processor system 102 or by a further processor not shown, or a combination of a memory and (de) multiplexer, etc. Selector 113 can be for example an address generator for addressing said memory 101 for making a selection. Comparator 114 may receive parameters from memory 101 and/or from processor system 102 and/or from a further processor not shown, and may receive comparison values from processor system 102 and/or from a further processor not shown. First interface 111 and second interface 112 and switch 103 for example comprise shift registers and/or buffers and/or further processors/memories, etc.

The term 'node(s)/link(s)' correspond with the term 'node(s) and/or link(s)'. Instead of each situation corresponding with a prediction in the future, whereby traffic is forecasted for moments in time lying in the future and yet to come, other choices could be made, like each situation corresponding with a different amount of traffic to be expected. Then, dependently upon the amount of traffic to be routed through the network, for example the next hour or the next day, a solution for the corresponding situation is to be selected. But whatever a situation is corresponding with, the corresponding traffic engineering problems are solved advantageously due to taking into account any interactions between these problems (and their solutions). Said route information (parameters) may comprise link load parameters and/or resource consumption parameters and/or fairness parameters and/or throughput parameters, but this is just a non-limitative list of said route information (parameters) for supporting said selecting.

Figure 3:
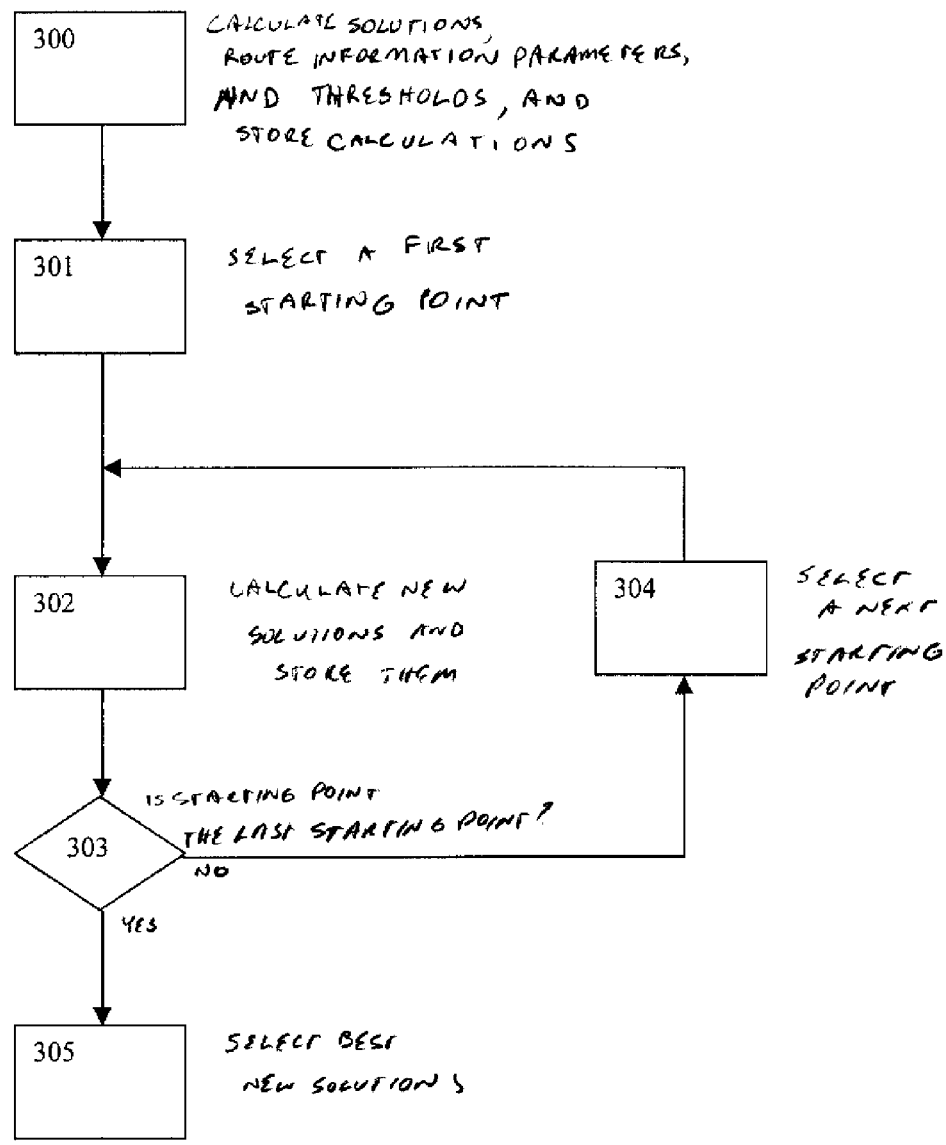

In the flow chart shown in FIG. 3 the blocks have the following meaning:

Block 300: calculate (for example by performing shortest path calculations and further path calculations and yet further path calculations) solutions per situation for all situations and calculate route information parameters per calculated solution and calculate thresholds and store all calculated solutions and all calculated route information parameters and all calculated thresholds; goto 301.

Block 301: select a first starting point in the previously stored calculated solutions; goto 302.

Block 302: calculate (for example by again performing shortest path calculations, but now by starting from said starting point and using a cost parameter corresponding with the number of amendments between said stored (subsequent) solutions to be minimized) new solutions and store them; goto 303.

Block 303: is said starting point the last possible starting point in the stored calculated solutions? If yes, goto 305, if no, goto 304.

Block 304: select a next starting point in the previously stored calculated solutions; goto 302.

Block 305: select the best new solutions; in case of more than one option, take into account thresholds etc.

The method according to the invention and the computer program product according to the invention function as follows. Calculate (for example by performing shortest path calculations and further path calculations and yet further path calculations) solutions per situation for all situations and calculate route information parameters per calculated solution and calculate thresholds and store all calculated solutions and all calculated route information parameters and all calculated thresholds (Block 300; goto 301). Select a first starting point in the previously stored calculated solutions (Block 301; goto 302). Calculate (for example by again performing shortest path calculations, but now by starting from said starting point and using a cost parameter corresponding with the number of amendments between said stored (subsequent) solutions to be minimized) new solutions and store them (Block 302; goto 303). Is said starting point the last possible starting point in the stored calculated solutions (Block 303)? If no, select a next starting point in the previously stored calculated solutions (Block 304; goto 302). If yes, select the best new solutions (Block 305). Usually said calculated new solutions will not offer more than one option. But in case of more than one option, take into account thresholds etc. and/or for example firstly minimize the maximum link load M and/or secondly minimize the resource consumption R. Of course, this could also be implemented when calculating said new solutions (in Block 302).

For implementing this method according to the invention and/or this computer program product according to the invention, any programming language can be used. Of course, the flow chart in FIG. 3 is just an example. Many alternatives are possible without departing from the scope of this invention. In practice, for example, said shortest path calculations (and further path calculations and yet further path calculations) on the one hand and said shortest path calculations now starting from said starting point and using a cost parameter corresponding with the number of amendments between said stored (subsequent) solutions to be minimized on the other hand could be combined into a combined shortest path calculation by adding one or more fictive nodes and defining certain (different) cost parameters for certain (fictive) links.

The invention claimed is:

1. A network management system for managing traffic signals in a network comprising nodes/links, said network management system comprising:
   a memory for storing node/link parameter signals defining nodes/links and for storing traffic parameter signals defining said traffic signals to be transported via nodes/links;
   a calculator coupled to said memory for calculating solutions defining intermediate nodes/links situated between sources and destinations for transporting said traffic signals from said sources to said destinations via said intermediate nodes/links and for calculating route information per solution;
   a comparator coupled to said calculator for:
   comparing solutions of a same situation with each other, wherein comparing includes determining an amount of path amendments between one or more pairs of solutions; and
   comparing solutions of different situations with each other, wherein comparing includes determining an amount of path amendments between one or more pairs of solutions related to different situations; and
   a selector coupled to said comparator for selecting a solution per situation based on at least one comparison result of the comparing solutions of the same situation and at least one comparison result of the comparing solutions of different situations, wherein said memory comprising node/link parameter signals and traffic parameter signals for several situations and said calculator calculates respective solutions for each situation, wherein each of said several situations corresponds with a prediction in the future related to said traffic signals being transported from at least one node to at least one other node, and wherein the route information comprises at least link load data and resource consumption data.

2. The network management system according to claim 1, wherein the at least one comparison result comprises similarities/differences between solutions of different situations.

3. The network management system according to claim 1, wherein said network management system comprises a processor which comprises at least one of said calculator, selector and comparator.

4. The network management system according to claim 1, wherein said route information comprises at least one of link load parameters, resource consumption parameters, fairness parameters and throughput parameters.

5. A network comprising nodes/links and at least one network management system for managing traffic signals in said network, said network management system comprising:

a memory for storing node/link parameter signals defining nodes/links and for storing traffic parameter signals defining said traffic signals to be transported via nodes/links;

a calculator coupled to said memory for calculating solutions defining intermediate nodes/links situated between sources and destinations for transporting said traffic signals from said sources to said destinations via said intermediate nodes/links and for calculating route information per solution;

a comparator coupled to said calculator for:

comparing solutions of a same situation with each other, wherein comparing includes determining an amount of path amendments between one or more pairs of solutions; and comparing solutions of different situations with each other, wherein comparing includes determining an amount of path amendments between one or more pairs of solutions related to different situations; and a selector coupled to said comparator for selecting a solution per situation based on at least one comparison result of the comparing solutions of the same situation and at least one comparison result of the comparing solutions of different situations, wherein said memory comprises node/link parameter signals and traffic parameter signals for several situations, and said calculator calculates respective solutions for each situation, wherein each of said several situations corresponds with a prediction in the future related to said traffic signals being transported from at least one node to at least one other node, and wherein the route information comprises at least link load data and resource consumption data.

6. A method for managing traffic signals in a network comprising nodes/links, said method comprises:

calculating solutions defining intermediate nodes/links situated between sources and destinations for transporting said traffic signals from said sources to said destinations via said intermediate nodes/links;

calculating route information per solution, with node/link parameter signals defining the nodes/links and traffic parameter signals defining said traffic signals to be transported via nodes/links being stored in a memory;

comparing solutions of a same situation with each other, wherein comparing includes determining an amount of path amendments between one or more pairs of solutions;

comparing solutions of different situations with each other, wherein comparing includes determining an amount of path amendments between one or more pairs of solutions related to different situations; and selecting a solution per situation based on at least one comparison result of the comparing solutions of the same situation and at least one comparison result of the comparing solutions of different situations, wherein said memory comprises the node/link parameter signals and traffic parameter signals for several situations, and respective solutions being calculated for each situation, wherein each of said several situations corresponds with a prediction in the future related to said traffic signals being transported from at least one node to at least one other node, and wherein the route information comprises at least link load data and resource consumption data.

7. A non-transitory computer-readable medium having computer program instructions stored thereon for managing traffic signals in a network comprising nodes/links, which when executed by a processor coupled to a memory for storing node/link parameter signals defining nodes/links and for storing traffic parameter signals defining said traffic signals to be transported via nodes/links, cause the processor to perform a method comprising:

calculating solutions defining intermediate nodes/links situated between sources and destinations for transporting said traffic signals from said sources to said destinations via said intermediate nodes/links;

calculating route information per solution;

comparing solutions of a same situation with each other, wherein comparing includes determining an amount of path amendments between one or more pairs of solutions;

comparing solutions of different situations with each other, wherein comparing includes determining an amount of path amendments between one or more pairs of solutions related to different situations; and selecting a solution per situation based on at least one comparison result of the comparing solutions of the same situation and at least one comparison result of the comparing solutions of different situations, wherein said memory comprises node/link parameter signals and traffic parameter signals for several situations, such that respective solutions are calculated for each situation, wherein each of said several situations corresponds with a prediction in the future related to said traffic signals being transported from at least one node to at least one other node, and wherein the route information comprises at least link load data and resource consumption data.

8. The network management system according to claim 1, wherein said prediction in the future relates to a point in time in the future.

9. The network according to claim 5, wherein said prediction in the future relates to a point of time in the future.

10. The method according to claim 6, wherein said prediction in the future relates to a point of time in the future.

11. The non-transitory computer-readable medium according to claim 7, wherein said prediction in the future relates to a point of time in the future.

12. The network management system according to claim 1, wherein said selector selects said solution per said respective situation based on a number of path amendments required to transition from one situation to another situation.

13. The network according to claim 5, wherein said selector selects said solution per said respective situation based on a number of path amendments required to transition from one situation to another situation.

14. The method according to claim 6, wherein said selector selects said solution per said respective situation based on a number of path amendments required to transition from one situation to another situation.

15. The non-transitory computer-readable medium according to claim 7, wherein said selector selects said solution per said respective situation based on a number of path amendments required to transition from one situation to another situation.

\* \* \* \* \*